United States Patent Office 3,267,176

Patented August 16, 1966

3,267,176

UNSATURATED POLYESTER COATING COMPOSITIONS

Bert H. Mahlman, West Chester, Pa., assignor to Hercules Incorporated, a corporation of Delaware No Drawing. Filed Mar. 8, 1963, Ser. No. 263,731
3 Claims. (Cl. 260—862)

The present invention relates to protective coatings and particularly to unsaturated polyester coating compositions which are thixotropic.

It is known that resinous coating compositions having good physical properties can be prepared using an interpolymer of an unsaturated polyester and a vinyl aromatic compound or an alkyl acrylate. However, coating compositions prepared with these interpolymers, either as the sole resinous component or in combination with other resinous materials, suffer from the disadvantage that they are subject to sagging or running, particularly when deposited on vertical surfaces as relatively thick films.

The prevention of sagging of thick coatings, i.e., coatings having a thickness greater than 5 mils, involves a delicate balance of rheological factors. During spraying, while the coating composition is subjected to high rates of shear, the rheology of the coating must permit atomization to fine drops; after application, at low rates of shear, the coating must not run or sag. Additionally, within a period of less than about 2 seconds immediately after spraying, the coating must be fluid enough to flow out or level to a smooth surface. In practice, a high solids coating composition must have thixotropic or pseudoplastic properties. Additionally, with coating compositions of this type it is difficult to control the glossiness (or degree of flatting) and the transparency of the cured coating without affecting the rheological and thixotropic properties of the composition.

It has now been discovered that sagging can be substantially eliminated and control maintained over the transparency and gloss of the cured coating without affecting the rheological properties of the coating compositions by incorporating in the composition a relatively small quantity of a finely divided, solid, cross-linked interpolymer, of divinylbenzene and styrene or an alkyl acrylate.

The coating compositions into which the cross-linked interpolymers are incorporated in accordance with this invention comprise as a resinous component a mixture of an unsaturated polyester resin and an interpolymerizable monomer selected from the group consisting of monovinyl aromatic compounds and alkyl acrylates, the mixture being copolymerizable at low temperatures to a hard solid.

By "unsaturated polyester resin" is meant a resin, the molecules of which each contain at least two ester groups and two ethylenically unsaturated portions through which interpolymerization among themselves and with the interpolymerizable monomer may take place. Such unsaturated polyester resins are prepared by the interesterification of suitable dibasic or polybasic acids with suitable alcohols to give polyesters in which either the alcoholic or the acidic portion thereof possesses the ethylenic unsaturation. One class of unsaturated polyester resins which is particularly valuable may be obtained by esterifying saturated dihydric alcohols, such as ethylene glycol, diethylene glycol, triethylene glycol, trimethylene glycol, α-propylene gycol, and 1:3-butylene glycol with α-unsaturated α,β-dicarboxylic acids, such as maleic, fumaric, itaconic and citraconic acids. This type of unsaturated polyester resin may be modified by replacing some of the unsaturated dibasic acids with an equivalent quantity of an acid, such as succinic, adipic, sebacic, phthalic, azelaic, tetrahydrophthalic, endomethylene tetrahydrophthalic, or hexachloroendomethylene tetrahydrophthalic acids, which do not contain groups polymerizably reactive with respect to organic substances containing interpolymerizable monomers.

The unsaturated polyester resins may be prepared by replacing the various dibasic acids described above with equivalent quantities of the anhydrides where the latter are readily available, and, if desired, mixtures of more than one reactant from each group may be employed. When it is desired that the final composition shall contain more than one single ester, it may be convenient to mix the acids or alcohols, which may include other polyhydric alcohols such as glycerol, prior to commencing the esterification reaction, to add one or more materials to a partially reacted mixture, or to mix two or more esters.

In order to produce coating compositions which may be applied at low viscosities, it is necessary that the compositions should contain a proportion of an interpolymerizable monomer. Monoethylenically unsaturated aromatic compounds having the formula

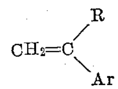

wherein Ar is a mononuclear aryl group and R is hydrogen or a methyl group, or compounds having the formula $CH_2{=}CR'COOR''$ wherein R' is hydrogen or methyl and R'' is an alkyl radical, are particularly useful. The alkyl substituent R'' may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferred monomers include styrene, α-methyl styrene, mono- or dichlorostyrenes, alkoxy styrenes, the vinyl toluenes, the alkyl acrylates, the alkyl methacrylates, and mixtures thereof.

The proportion of unsaturated polyester resin to interpolymerizable monomer necessary in the production of low temperature curing compositions varies according to the nature of the compositions, but usually such compositions contain between 10 and 90% and preferably between 40 and 80% by weight of the unsaturated polyester resin. When mixed in these proportions the components form a liquid solution.

The coating compositions of the type described above may be cured by the action of heat alone or, alternatively, by the addition to the mass of suitable curing catalysts. Such catalysts include organic peroxides such as benzoyl peroxide, cyclohexanone peroxide, lauryl peroxide, isopropylbenzene hydroperoxide, tertiary butylbenzene hydroperoxide, methyl ethyl ketone peroxide, and 1-hydroxy cyclohexyl hydroperoxide-1. The rate of cure of the composition may also be modified by the addition of suitable inhibitors such as hydroquinone, α-naphthol, tertiary butyl catechol, benzaldehyde or tetrachloroquinone and promoters such as certain amines like dimethyl aniline, diethyl aniline, di-n-propyl aniline, dimethyl-para-toluidine, diethyl-α-naphthylamine, para-dimethylamino azobenzene and dimethyl meta-aminophenol and metallic salts such as cobalt and manganese naphthenate. The use of such curing catalysts and promoters enables the cure of the composition to be brought about at low temperatures, e.g., below room temperature.

The finely divided, solid, cross-linked interpolymers which serve as antisagging agents in accordance with the invention are cross-linked interpolymers prepared from divinyl benzene and a monomer selected from the group consisting of styrene and alkyl acrylates, and most suitably are styrene-divinylbenzene copolymers, methyl methacrylate-divinylbenzene copolymers, styrene-methyl methacrylate-divinylbenzene terpolymers, styrene-dibutyl-maleate-divinylbenzene terpolymers, and the like. It is within the scope of the present invention to use mixtures of these finely divided cross-linked interpolymers containing a major proportion of styrene or alkyl acrylate units in their molecular structure.

In order to obtain suitable coating compositions, it is essential to use the cross-linked interpolymer in a finely divided form. Particularly satisfactory results are obtained when the cross-linked interpolymer is used in the form of a free-flowing powder such as can be obtained from the usual emulsion polymerization processes. Most suitably the diameters of the finely divided cross-linked interpolymer particles should lie in the range of 0.01 micron to 10 microns, although larger particles may be used. Cross-linked interpolymers which have been prepared by other polymerization techniques and which have a particle size greater than about 10 microns may be physically ground using any of the known methods to give particles of the desired size for use in practice of the invention.

The proportion of the finely divided cross-linked interpolymer present in coating compositions of the invention may be varied considerably according to the conditions of use. Particularly satisfactory results are obtained when using a proportion of cross-linked interpolymer which is of the order of 1 to 20% by weight of the coating composition, and preferably 3 to 10%.

The compositions of the invention are prepared by dispersing the finely divided cross-linked interpolymer in the coating composition. The incorporation of the finely divided cross-linked interpolymer may be carried out by high speed stirring or by milling in one of the usual type of mills which are employed for dispersing pigments in paint media. The preferred type of mixer is one which does not stir high proportions of air into the compositions because it has been found that dispersed air renders the handling of the composition more difficult and, in some cases, adversely affects the curing of the resin. In order to aid the dispersion of the cross-linked interpolymer in the bonding composition, it is often convenient to add small quantities of suitable wetting or dispersing agents to the mixture. Such agents include soaps, long chain alcohol-ethylene oxide condensates, mixtures of long chain fatty alcohols and the like.

The quantity of wetting or dispersing agents present in the coating compositions of the present invention is not critical but most suitably ranges from 1 to 5% by weight of the cross-linked interpolymer. Many of the known emulsion or dispersion polymerization processes lead to the production of finely divided cross-linked interpolymer particles containing wetting or dispersing agents and accordingly such interpolymers are particularly useful for the process of the present invention when it is desired that the composition should contain a wetting or dispersing agent. However, the wetting or dispersing agent can be removed from the emulsion polymerization products if desired.

The coating compositions containing the finely divided cross-linked interpolymer particles are often highly thixotropic liquids, wherein the degree of thixotropy and flow properties in general depend on various variable factors of the composition such as the nature of the unsaturated polyester resin, the interpolymerizable monomer mixed therewith, and, particularly, the amount and average particle size of the cross-linked interpolymer present in the composition. Thus, by adjusting the above-mentioned variable factors, it is possible to produce a composition having a degree of thixotropy particularly adapted to a specific purpose. The thixotropic nature of the compositions of the present invention is particularly valuable when associated with a polyester styrene mixture which has a low viscosity value, since it has been with such compositions that hitherto the drainage problem has been most marked. The thixotropy of the present compositions reduces the drainage of the compositions from the surfaces to be coated without materially affecting the ease of application which results from the low viscosity of the composition.

The curing of the coating compositions of the present invention may be achieved by any of the techniques which have hitherto been employed with unsaturated polyester resin compositions. The rate of cure may be adjusted by varying the amount of catalyst, promoter and inhibitor present in the coating composition, by varying the coating composition, and also by varying the temperature at which the curing reaction is allowed to proceed.

The curing temperature of the coating composition can be varied from below 25° C. to 150° C. or more, depending on the catalyst system, coating composition, and monomer volatility. It is often preferred to bring about the cure of the compositions of the present invention at room temperature, i.e., below 25° C.

As has been pointed out above, the coating compositions of the present invention produced cured coatings having good clarity and transparency as well as reduced gloss. When transparency is not an important criteria, dyes, pigments, fillers, plasticizers, and the like may be added to the composition without detracting from the other advantages of the invention. Likewise, flatting agents may also be added to decrease the gloss to an even greater extent. Such agents of course, will vary the transparency of the cured coating to a minor degree dependent upon refractive index and amount employed.

The coating compositions of the present invention may be used in any known way, for example, brushing, rolling or spraying.

The following examples, wherein all parts are by weight unless otherwise specified, demonstrate coating compositions and their use as applied by spraying on wooden panels.

The unsaturated polyester resin employed in the examples below comprised the esterification product of 1.05 moles propylene glycol and 1 mole of a 1:1 mixture (molar basis) of maleic and isophthalic acid, and was prepared by heating the reactants at about 210° C. while removing the water of esterification until an acid value of about 15 was obtained.

EXAMPLES 1–5

A wax-free polyester base solution was prepared from

| | Parts |
|---|---|
| Unsaturated polyester resin | 1562 |
| Styrene | 1045 |
| Triallyl pentaerythritol | 312 |
| Coconut oil modified phthalic alkyd resin[1] | 52 |
| [Silicone oil (1% solution in toluol)] | 61 |
| Cobalt naphthenate (6% metal) | 20.8 |
| Hydroquinone | 0.52 |

[1] Alkyd was prepared by reacting pentaerythritol, ethylene glycol, phthalic anhydride, coconut fatty acid, and fumaric acid in the molar proportion of 1:1:1.7:1.5:0.06 in xylene to give a resin solution having a solids content of 60%, an acid number not greater than 6, a specific gravity of 1.04 at 25/25° C., and a Gardner-Holdt viscosity of Z1–Z3.

by dissolving the unsaturated resin in the styrene and adding the remaining ingredients with stirring until a homogeneous solution was obtained. The base solution thus prepared was then utilized to formulate coating compositions in accordance with the invention by agitating the ingredients together for 2–4 minutes using a Waring Blendor. The coating compositions were sprayed on wooden panels and air dried at about 25° C. for 16 hrs. The formulation for each example and the evaluation of the flow-out or leveling and sagging characteristics are presented in Table I.

TABLE II

| Example | Monomer Composition of Cross-linked Interpolymeric Additive (percent) | | | | Film Evaluation | | |
|---|---|---|---|---|---|---|---|
| | Divinylbenzene | Styrene | Methyl Methacrylate | Dibutyl Maleate | Sagging | Transparency | |
| | | | | | | Spraying Solution | Cured Film |
| 6 | 5 | 95 | | | None | Milky | Hazy. |
| 7 | 5 | 70 | 25 | | do | Hazy | Slight Haze. |
| 8 | 5 | 45 | 50 | | do | Very Slight Haze | Clear. |
| 9 | 5 | | 95 | | Moderate | do | Slight Haze. |
| 10 | 4 | 56 | | 40 | None | Milky | Do. |
| 11 | 5 | 70 | | 25 | do | Hazy | Do. |
| 12 | 5 | | 70 | 25 | Slight | Very Slight Haze | Very Slight Haze. |

*Table I*

| | Examples | | | | |
|---|---|---|---|---|---|
| | 1 | 2 | 3 | 4 | 5 |
| Coating Formulation: | | | | | |
| Base solution | 100 | 100 | 100 | 100 | 100 |
| Styrene | 38.4 | 38.4 | 38.4 | 38.4 | 38.4 |
| Styrene:divinylbenzene interpolymer (95:5)[1] | | 2.0 | 4.0 | 6.0 | 14.2 |
| Cyclohexanone peroxide[2] | 3.4 | 3.4 | 3.4 | 3.4 | 3.4 |
| Maximum coating thickness without sagging (mils) | $<2$ | $<3$ | $<6$ | $>6$ | $>9$ |
| Flow-out and leveling | (3) | (3) | (3) | (4) | (5) |

[1] Average particle size less than about 1 micron.
[2] 50% dispersion in dibutyl phthalate.
[3] Very good.
[4] Good.
[5] Poor.

EXAMPLES 6–12

A polyester base solution was prepared from

| | Parts |
|---|---|
| Unsaturated polyester resin | 1562 |
| Styrene | 1045 |
| Triallyl pentaerythritol | 312 |
| Cobalt naphthenate (6% metal) | 20.8 |

The base solution thus prepared was then used to formulate coating compositions in the manner of Examples 1–5 using 100 parts base solution, 60 parts styrene, 6 parts cross-linked interpolymeric additive, and 4.5 parts of a 50% dispersion of cyclohexanone peroxide in dibutyl phthalate. The coatings were evaluated by spraying the composition on glass panels and curing on a vertical surface to give a final film about 5 mils thick. The cross-linked additive for these examples was prepared by emulsion polymerizing various monomers at 50° C. and then isolating the interpolymer as a powder having a particle size not greater than about 1 micron. Details as to cross-linked additives and film characteristics are recorded in Table II.

What I claim and desire to protect by Letters Patent is:

1. A liquid preformed homogeneous antisag coating composition which has good flow-out and is low temperature curable to a coating of controlled gloss and transparency, said composition comprising a mixture of, by weight of the mixture, (1) from about 10 to about 90% of a polymerizable unsaturated polyester resin comprising the condensation polymerization reaction product of an $\alpha,\beta$-ethylenically unsaturated dicarboxylic acid and a diol, (2) from about 90 to about 10% of an interpolymerizable monomer selected from the group consisting of (a) compounds having the formula

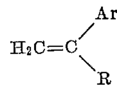

in which Ar is a mononuclear aryl radical containing no olefinic unsaturation and R is a member selected from the group consisting of hydrogen, and alkyl radicals and (b) compounds having the formula $$CH_2{=}CR'COOR''$$

in which R′ is selected from the group consisting of hydrogen and methyl and R″ is an alkyl radical and (3) the mixture-insoluble, finely divided, solid, cross-linked interpolymer prepared from divinylbenzene and a monomer selected from the group consisting of styrene and alkyl acrylates, said finely divided cross-linked interpolymer having an average particle size of about 0.01 to about 10 microns and being present in an amount ranging from 1 to 20% by weight of the mixture and sufficient to form a thixotropic composition of reduced tendency to sag, said mixture comprising the cross-linked interpolymer (3) dispersed in a solution of the polyester (1) in the interpolymerizable monomer (2).

2. The composition of claim 1 wherein the alkyl acrylate is methyl methacrylate.

3. The composition of claim 1 wherein the cross-linked interpolymer is a terpolymer of styrene, methyl methacrylate and divinylbenzene having a monomer ratio of 45:50:5.

References Cited by the Examiner

UNITED STATES PATENTS

| | | | |
|---|---|---|---|
| 2,340,109 | 1/1944 | D'Alelio | 260—862 |
| 2,378,195 | 6/1945 | D'Alelio | 260—80.5 |
| 2,482,825 | 9/1949 | Amos et al. | 260—80.5 |
| 2,537,951 | 1/1951 | Amos | 260—80.5 |
| 2,678,306 | 5/1954 | Ferris | 260—80.5 |
| 3,124,553 | 3/1964 | Cordts | 260—901 |

SAMUEL H. BLECH, *Primary Examiner.*

MURRAY TILLMAN, *Examiner.*

J. T. GOOLKASIAN, *Assistant Examiner.*